US006663001B2

(12) United States Patent
Suttie et al.

(10) Patent No.: US 6,663,001 B2
(45) Date of Patent: Dec. 16, 2003

(54) SELF SERVICE TERMINAL

(75) Inventors: Robert J. Suttie, Alyth (GB); Patrick Strachan, Dundee (GB); Symon P. A. Buckman, Dundee (GB); Marcus Haley, Godalming (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 10/294,952

(22) Filed: Nov. 14, 2002

(65) Prior Publication Data

US 2003/0116622 A1 Jun. 26, 2003

(30) Foreign Application Priority Data

Dec. 20, 2001 (GB) ............................................ 0130480

(51) Int. Cl.[7] ................................................ G06F 17/60

(52) U.S. Cl. ............................. 235/379; 902/9; 902/12; 235/381

(58) Field of Search ................................ 235/379, 475, 235/481, 380, 381, 384, 485; 902/14, 12, 8; 271/10.01; 705/43

(56) References Cited

U.S. PATENT DOCUMENTS

| | | | | | |
|---|---|---|---|---|---|
| 4,465,925 | A | * | 8/1984 | Goi | 235/379 |
| 4,597,330 | A | * | 7/1986 | Hill et al. | 101/93.01 |
| 5,422,467 | A | * | 6/1995 | Graef et al. | 235/379 |
| 5,540,425 | A | * | 7/1996 | Graef et al. | 271/225 |
| 5,553,320 | A | * | 9/1996 | Matsuura et al. | 235/379 |
| 5,555,983 | A | | 9/1996 | Yamagishi | |
| 5,751,842 | A | | 5/1998 | Riach et al. | |
| 5,984,177 | A | * | 11/1999 | Do et al. | 235/379 |
| 6,000,555 | A | * | 12/1999 | Anma | 209/534 |
| 6,109,522 | A | * | 8/2000 | Force et al. | 235/379 |
| 6,241,150 | B1 | * | 6/2001 | Patterson | 235/379 |
| 6,250,408 | B1 | * | 6/2001 | Trujillo et al. | 175/393 |
| 6,315,194 | B1 | * | 11/2001 | Graef et al. | 235/379 |
| 6,474,548 | B1 | * | 11/2002 | Montross et al. | 235/379 |
| 6,520,408 | B1 | * | 2/2003 | Force et al. | 235/379 |
| 6,572,013 | B2 | * | 6/2003 | Katou et al. | 235/379 |

FOREIGN PATENT DOCUMENTS

| | | |
|---|---|---|
| EP | 0 613 107 A1 | 8/1994 |
| EP | 0 653 734 A2 | 5/1995 |
| EP | 0 845 763 A1 | 6/1998 |
| EP | 0 965 956 A2 | 12/1999 |

* cited by examiner

*Primary Examiner*—Karl D. Frech
*Assistant Examiner*—Edwyn Labaze
(74) *Attorney, Agent, or Firm*—Michael Chan

(57) ABSTRACT

A self service terminal (SST) 10 is described, having a deposit means 18 for allowing a user to deposit a number of media items into the SST. A single media transport path 20 transports deposited items via an escrow storage 22 to either a check bin 24 or a banknote bin 26. Items may be determined as banknotes or checks either automatically by the SST, by means of a media scanner and verifier 30, or manually, by allowing the user to identify the deposited items. The SST also comprises a safe 34, within which the banknote bin 26 is located. Embodiments of the invention may provide the check bin 24 either within or outside the safe 34. Various methods of processing media deposited into the SST are also described.

6 Claims, 5 Drawing Sheets

SELF SERVICE TERMINAL

BACKGROUND OF THE INVENTION

The present invention relates to a self service terminal (SST), and to a method of processing media deposits made to an SST.

Self service terminals, such as automated teller machines (ATMs), are used for a wide range of financial and other transactions. One such transaction is the deposit of valuable media, such as cash and checks, into the SST, generally for the purpose of crediting the deposit to the user's bank or other financial institution account. Indeed, in certain countries, where interest may be calculated on a user's account daily, it is not uncommon for large numbers of deposit transactions to take place towards the end of each day, as users deposit any cash they may have into an SST.

It is also convenient for users to be able to deposit checks and the like into SSTs as well as cash. However, the handling and processing of cash and checks will generally differ. For example, when cash is deposited into an SST, the SST will generally verify the validity of the cash (by, for example, detecting security features incorporated into genuine banknotes), and store the verified cash within a safe of the SST, for security reasons. Once the cash has been verified, the value of the deposited cash may be credited to a user's account immediately.

If checks are deposited, however, these must generally first be verified and the value of the check determined, usually by means of a relatively simple verification procedure such as the use of magnetic ink character recognition (MICR), before being stored within the SST. MICR is based on a set of industry standards, and such standards will be known to those of skill in the art. The value of the check cannot be credited to a user's account, however, until the check has been cleared against the check issuer's account. This may involve returning the actual check to the financial institution of the issuer, although to accelerate the process it is now possible to obtain an image of the check and electronically transfer the image to the issuer's financial institution. The checks themselves however may nonetheless still be returned to the issuing institution for subsequent verification.

These two different transaction processing paths are typically implemented in an SST by means of two largely distinct processing subunits or modules. This therefore increases the complexity and expense of such SSTs, as well as increasing maintenance costs. Further, despite the fact that deposited checks are in themselves of low value (since they can only generally be credited to the correct payee's account), it is common for deposited checks to be stored within the safe of the SST together with deposited cash. Thus, when the SST operator wishes to retrieve the checks from the SST, it is necessary to send an individual with sufficient security clearance to access the safe of the SST, even if cash is not being retrieved. This again increases the cost of maintaining and operating such SSTs.

SUMMARY OF THE INVENTION

It is among the objects of embodiments of the present invention to obviate or alleviate the difficulties of maintaining and operating SSTs with separate transaction processing modules. It is further among the objects of certain embodiments of the invention to provide means whereby deposited checks may be stored in a relatively low-security environment, separated from any deposited cash, thereby reducing the costs of operating such SSTs.

According to a first aspect of the present invention, there is provided a method of processing media deposits into a self service terminal (SST), the method comprising the steps of:

a) receiving a media deposit comprising at least one media item into an SST;

b) determining whether each deposited item is cash or a check;

c) analyzing each deposited item, to verify the items;

d) transferring each deposited check item into a check deposit bin; and e) transferring each deposited cash item into a cash deposit bin.

The step of determining whether each deposited media item is cash or a check may be carried out automatically by the SST, for example, as part of the analyzing step. This allows the user to make a single deposit of a mixture of different types of media item. Alternatively, the determination may comprise the steps of asking the user to confirm whether the deposited items are cash or checks; that is, the determination is carried out 'manually'. Where the determination is manual, it is preferred that the media deposit comprises only a single type of media item; this may not however be entirely under the control of the operator of the SST, and in such situations where a mixed deposit is inadvertently made by the user, the method may comprise the step of returning those items which are not of the correct type to the user.

The step of analyzing the deposited items may comprise detecting one or more security features incorporated into genuine media items. In the case of cash, these security features may include magnetic regions of banknotes; metallic threads; the notes' response to light of different wavelengths; the type of ink used; the type of paper used; and so forth. Methods for detecting and verifying these features will be known to those of skill in the art. Similar security features may be used in checks, although it is common for checks to incorporate fewer security features than banknotes. A common feature used in checks is the use of magnetic ink for printing of numeric codes, as detected by MICR; verification of checks may comprise simply detection of the codes printed on the check by MICR. The analysis may also include the step of determining the value of the deposited items; in the case of cash, it is usual for each denomination of banknote to include a characteristic pattern of security features, such that detection of the security features allows the note to be both verified and valued, while in the case of pre-printed checks, the MICR codes typically do not include a representation of the value of the check. For hand-written and pre-printed checks, the value is typically determined from optical character recognition (OCR) of the check.

Where the value of the deposited items has been determined, the method may further comprise the step of asking the user to confirm the determined value of the deposit. If the user agrees with the calculated value, the transaction may proceed as usual, while if the user disagrees, the deposited items may be returned to the user without further processing. This allows the user either to re-enter the returned items, or to take them to a bank for manual deposit.

The method may further comprise the step of returning unverified items to the user. Alternatively, or in addition, items identified as non-genuine (rather than simply unverified) may be transferred to a forgery bin, for storage. This allows forged items to be removed from circulation, while unverified items (for example, non-media items, or blank checks, or the like) may be returned to the user. There will often be a detectable difference between unverifiable items and non-genuine items, since non-genuine items will have been intended to have the appearance of genuine items, but will lack one or more of the genuine security features.

The method may further comprise the step of transferring the deposited items to an escrow storage. This step preferably occurs between the analysis and other transfer steps. Escrow storage allows the deposited items to be temporarily stored with the possibility of returning the items to the user. Thus, the deposited items may remain in escrow prior to confirming a calculated value of the items with the user, or escrow may be used to allow unverified items to be returned, with verified items proceeding to either of the cash or check bins.

The SST preferably includes a secure storage location for valuable media; for example, the SST may include a safe. Preferably the cash bin is located within the safe. The check bin may be located within the safe, or outside the safe. Locating the check bin outside the safe provides advantages in terms of cost and ease of collecting deposited checks from the SST.

The method may further comprise the steps of printing validation information onto deposited checks, and obtaining an image of the printed check. For example, information regarding the identity of the user and the determined value of the deposited check may be printed onto the check, as may be details of the SST operator and the like. The image of the printed check may then be electronically transferred to a financial institution for payment of the funds represented by the check. Where the check bin is located outside an SST safe, the steps of printing and scanning deposited checks may also take place outside the safe. Once the check has been printed and an image obtained, the check itself need not be present for payment of the funds to take place; thus the value of the printed check is reduced. This allows these steps to be conducted outside a secure safe without compromising security.

The check bin may comprise an escrow storage. This allows deposited checks to be dispensed from the SST along the conventional media dispense path. The method may then further comprise the step of subsequently dispensing deposited checks to an operator of the SST. This again reduces the need for operators with appropriate security clearance to gain access to the safe of the SST, since low-security checks may be collected by operators with no access to the SST safe.

According to a second aspect of the present invention, there is provided a self service terminal (SST), the SST comprising:

- user interaction means for interacting with a user;
- deposit means for allowing a user to deposit one or more media items into the SST;
- means for determining whether each deposited item is cash or a check;
- analysis means for analyzing deposited items, to verify the items;
- a check bin for storing deposited checks;
- a cash bin for storing deposited cash; and
- means for transferring deposited items from the deposit means to a selected one of the bins via the analysis means.

Preferably the SST further comprises a safe, within which the cash bin is located. In selected embodiments of the invention, the check bin may also be located within the safe.

The user interaction means may comprise any or all of: display screen, touch sensitive screen, numeric or alphanumeric keypad, function keys, magnetic or smart card reader, voice recognition systems, and the like.

The analysis means may comprise any or all of: optical imaging device, magnetic sensors, ultraviolet or infrared imager devices, chemical sensors, size sensors, and the like.

The means for determining whether a deposited item is cash or a check may comprise, for example, means for interpreting the output of the analyzing means, such as a computer processor or the like; or may comprise part of the user interaction means, and allow a user to inform the SST as to the identity of deposited items.

The SST may further comprise an escrow storage location for storing deposited items prior to transferring them to a selected one of the storage bins. The escrow storage location is preferably arranged to-permit items in escrow to be returned to a user without passing through either of the bins.

The SST may further comprise a forgery bin for storing items. The SST preferably also comprises means for determining the validity of deposited items.

The SST may further comprise means for valuing deposited items. This may be part of the analysis means, or may be separate.

The check bin may comprise a check escrow bin, together with means for selectively returning the contents of the check escrow bin to the deposit means. This allows the SST operator to collect deposited checks from the SST without requiring access to the interior of the SST.

The SST may further comprise means for recording information on deposited checks, and means for obtaining an image of such checks. The SST may still further comprise means for transferring obtained images to a remote location.

According to a still further aspect of the present invention, there is provided a self service terminal (SST) comprising:

- a display for displaying information and instructions to a user;
- a data entry device for allowing a user to enter data and instructions to the SST;
- a deposit device for allowing a user to deposit media items into the SST;
- one or more detectors for detecting selected characteristics of deposited media items;
- a processor for verifying deposited media items based on detected characteristics;
- a processor for determining whether deposited media items are cash or checks;
- a check storage area for storing deposited checks;
- a cash storage area for storing deposited cash; and
- a media transport arrangement for transporting media items from the deposit device to a selected one of the storage areas, via the detectors.

According to a yet further aspect of the present invention, there is provided a method of processing media deposits into a self service terminal (SST) having a safe, the method comprising the steps of: receiving a media deposit comprising a plurality of media items of a single media type into an SST; receiving information from a user to determine whether each deposited item is cash or a check; analyzing each deposited item, to verify the items; transferring each deposited cash item into a cash deposit bin located within a safe of an SST; and transferring each deposited check item into a check deposit bin located outside the safe of the SST.

According to a yet further aspect of the present invention, there is provided a method of processing media deposits into a self service terminal (SST) having a safe, the method comprising the steps of: receiving a media deposit comprising a plurality of media items of a single media type into an SST; receiving information from a user to determine whether each deposited item is cash or a check; analyzing each deposited item, to verify the items; transferring each deposited cash item into a cash deposit bin located within a safe of an SST; and transferring each deposited check item into a check deposit bin located within the safe of the SST.

According to a yet further aspect of the present invention, there is provided a method of processing media deposits into a self service terminal (SST) having a safe, the method comprising the steps of: receiving a media deposit comprising a plurality of media items of one or more media types into an SST; determining whether each deposited item is cash or a check; analyzing each deposited item, to verify the items; transferring each deposited cash item into a cash deposit bin located within a safe of an SST; and transferring each deposited check item into a check deposit bin located outside the safe of the SST.

According to a yet further aspect of the present invention, there is provided a method of processing media deposits into a self service terminal (SST) having a safe, the method comprising the steps of: receiving a media deposit comprising a plurality of media items of one or more media types into an SST; determining whether each deposited item is cash or a check; analyzing each deposited item, to verify the items; transferring each deposited cash item into a cash deposit bin located within a safe of an SST; and transferring each deposited check item into a check deposit bin located within the safe of the SST.

BRIEF DESCRIPTION OF THE DRAWINGS

These and other aspects of the present invention will now be described by way of example only and with reference to the accompanying drawings, in which.

DETAILED DESCRIPTION

Figure 1:
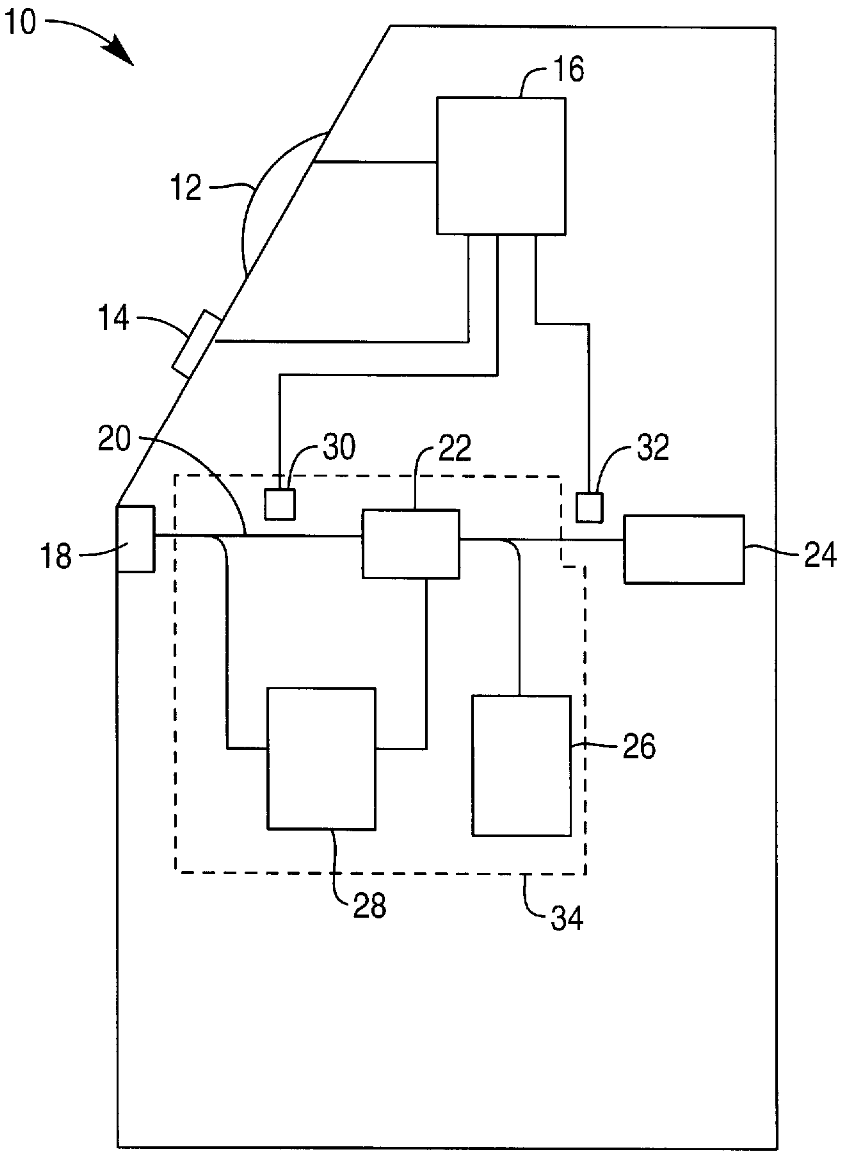
FIG. 1 shows a schematic representation of a self service terminal (SST) in accordance with one embodiment of the present invention.

Referring first of all to FIG. 1, this shows a self service terminal (SST) in accordance with one embodiment of the present invention. The SST 10 includes a display screen 12 and a numeric keypad 14 for interacting with a user, both of which are connected to and controlled by a central processor 16. A media deposit aperture 18 allows a user to deposit media items into the SST 10, and has a media transport path 20 connecting the deposit aperture 18 to an escrow storage 22, a check deposit bin 24, a banknote deposit bin 26, and a purge bin 28. The purge bin 28 is typically used to capture any checks or banknotes that are not removed by a user, thereby ensuring that the SST 10 remains operational. A media validation sensor 30 is connected to the central processor 16, and located adjacent the media transport path 20 before the escrow storage 22, while a check printer and imager station 32 is located before the check bin 24. A secure safe 34 encloses the majority of the media transport path 20, together with the escrow storage 22, the banknote bin 26, and the purge bin 28. The check bin 24 is located outside the safe 34.

The operation of the SST 10 to process deposited media will now be described, with reference also to FIG. 2, which is a flow diagram of the transaction processing path. The user initially interacts with the SST 10 by means of the display screen 12, keypad 14, and card reader, if present, to establish the user's identity, and to obtain access to the user's bank account.

The user may then select a desired transaction from a choice of available options presented to them by the SST 10, among the options being deposit of media. The user is then asked to confirm the type of media they will be depositing—banknotes, or checks. The SST 10 as described here is not configured to be able to accept different media types in a single deposit, and so the user must manually separate their media into banknotes only or checks only. Mixed denominations of banknotes are acceptable. As will be described below, however, embodiments of the present invention may be configured to accept mixed deposits.

The user then deposits a bundle of the appropriate media type 118 into the deposit aperture 18. The media transport path 20 is then actuated, which transports the media items individually past the media validation sensor 30, 130 to escrow storage 22, 122. The media validation sensor 30, in combination with the processor 16, tries to detect particular security features of the deposited media. For example, the sensor 30 may detect magnetic properties of deposited media, or may include optical sensors to examine the media. A number of different types of sensor may of course be combined. The sensor 30 is also used to determine the value of the deposited media—if the media comprises banknotes, each denomination is generally distinguishable by means of various security features, while the face value of checks may be determined using optical character recognition technology, or by MICR techniques. The deposited media is then stored in the escrow storage 22, 122 while the user is requested to confirm the value of the deposited media. If the user disagrees with the value as determined by the SST 10, the media may be diverted to the purge bin 28, 128, and then returned to the user via deposit aperture 18.

In addition, unidentifiable media items (for example, poor condition banknotes, or non-standard checks) may also be returned to the user at this stage. Banknotes which can be identified as forgeries, on the other hand, may be diverted to a specific forgery storage bin 131 (shown on FIG. 2) for later disposal.

If the user confirms the value of the deposited media items, the items are then transported to either the banknote bin 26, 126 or the check bin 24, 124, depending on the type of media which is being deposited. Banknotes will simply be transported to the bin 26 within the safe 34, and await subsequent collection by the SST operator, while the value of the deposited notes may be credited to the user's account immediately, as the banknotes have been validated by the SST. Checks pass to the check deposit bin 24 located outside the safe 34, via a check printer and imaging station 32, 132. This station 32, 132 endorses the deposited check by printing various information thereon, while an image of the printed check is acquired. The image of the check may then be electronically transferred to a remote location for validation and clearance of the check, after which the deposited funds may be credited to the user's account. The deposited checks are stored outside the safe 34, hence at appropriate times the SST operator may empty the check bin 24 and retrieve the checks simply by opening the body of the SST 10, but not the safe 34. This allows persons to collect checks without having access to the cash in the safe 34.

Figure 2:
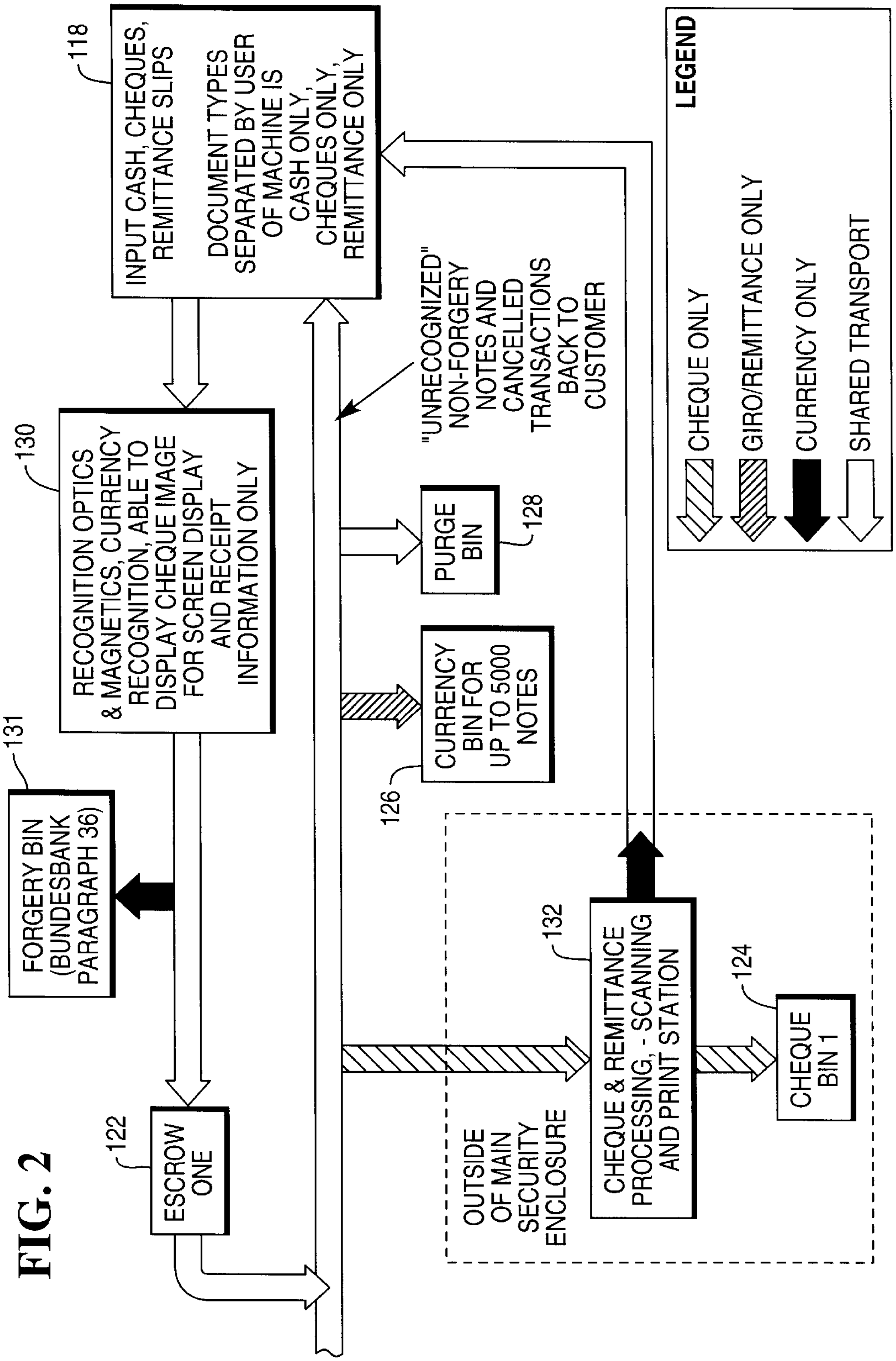
FIGS. 2 to 5 show flow diagrams illustrating several embodiments of methods of processing media deposits, in accordance with the present invention.
Figure 3:
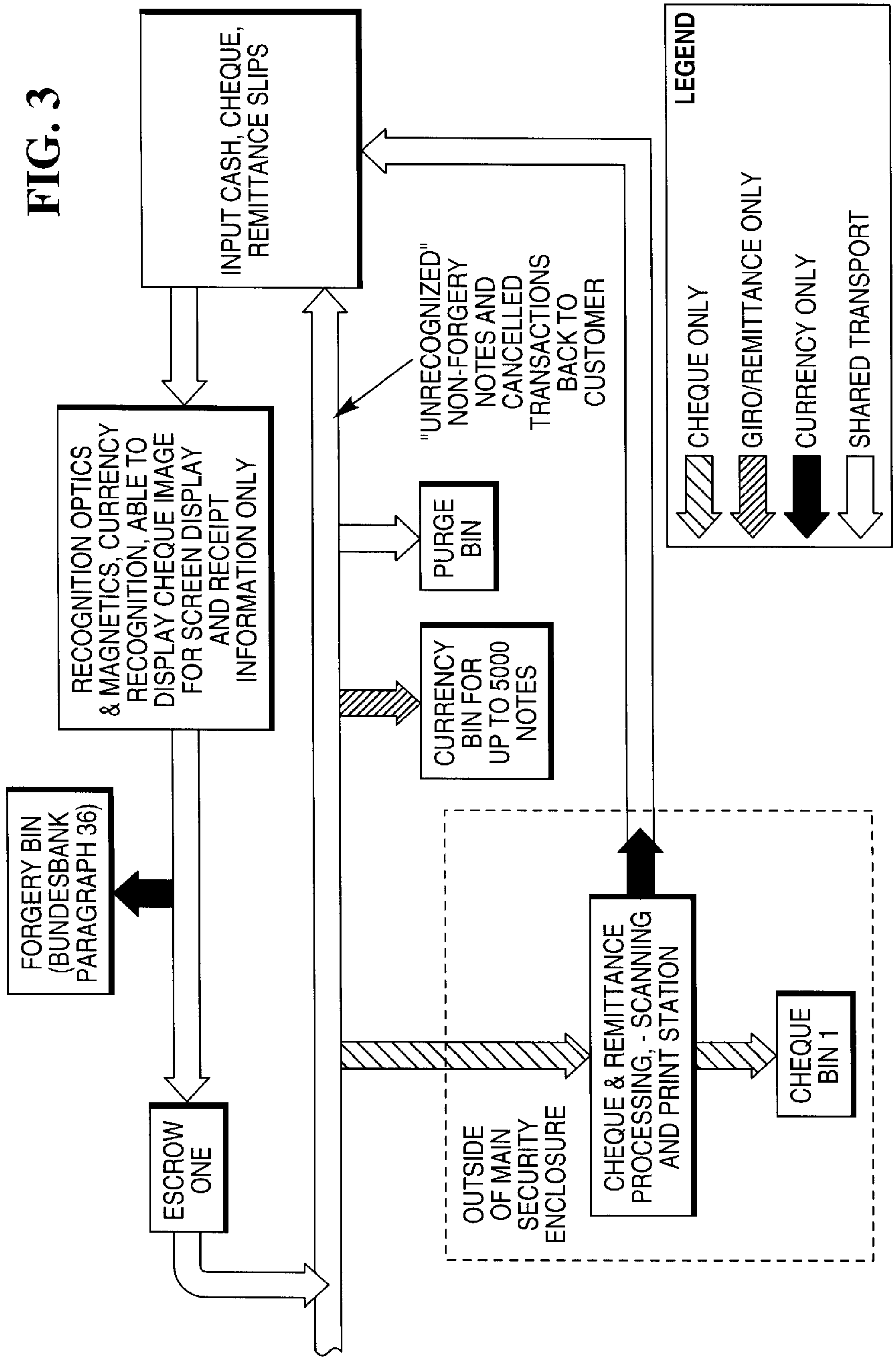

The transaction processing as described, and as shown in FIG. 2, requires that the user manually sort the items to be deposited. A variation in this processing is shown in FIG. 3, which illustrates a similar procedure with the exception that a mixed bundle of media may be deposited by the user. The validation scanner 30 may also be used, however, to determine the type of deposited media, as well as whether the media is genuine. The SST 10 then automatically determines whether each media item is to be directed to the banknote bin or the check bin, as appropriate.

Figure 4:
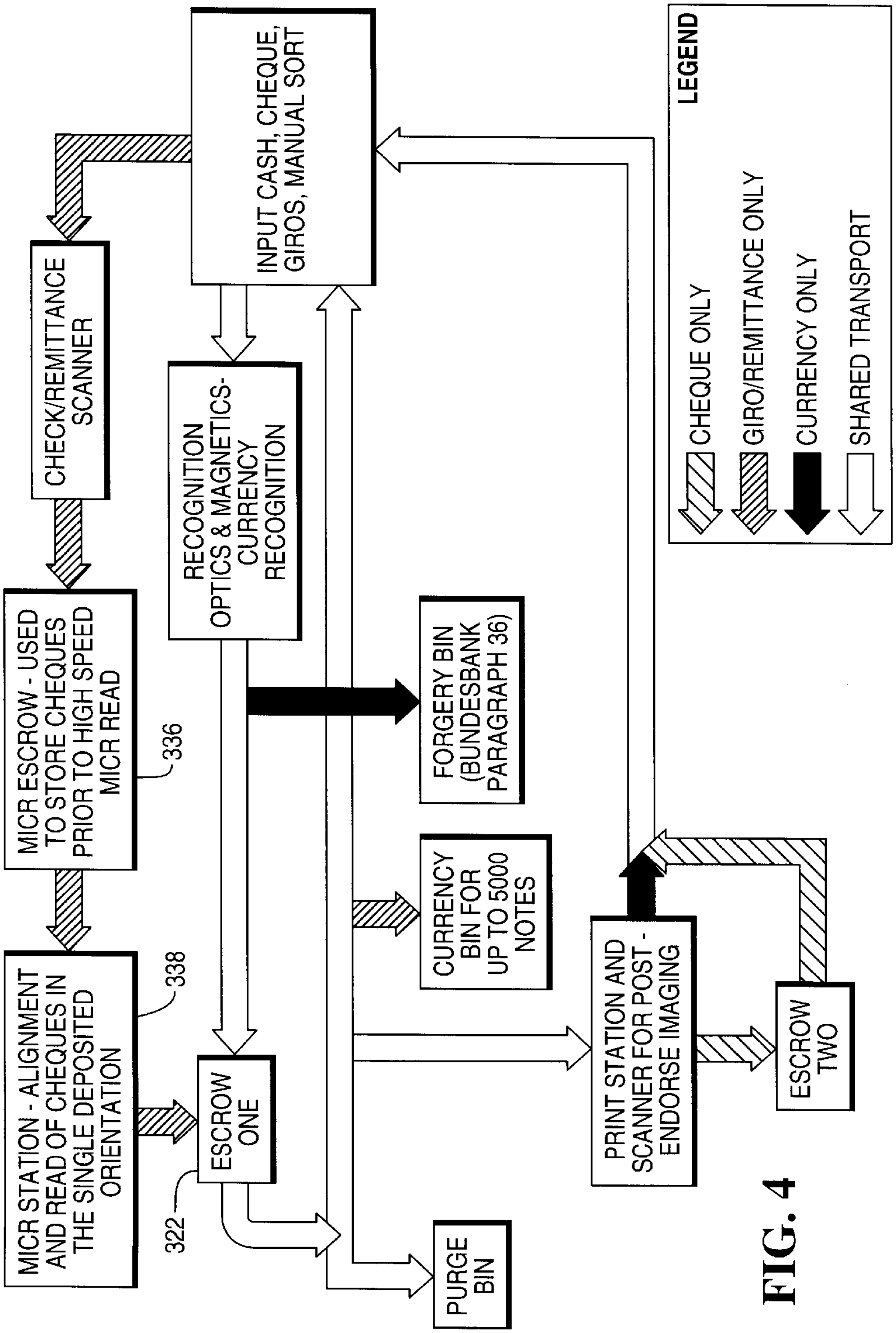
Figure 5:
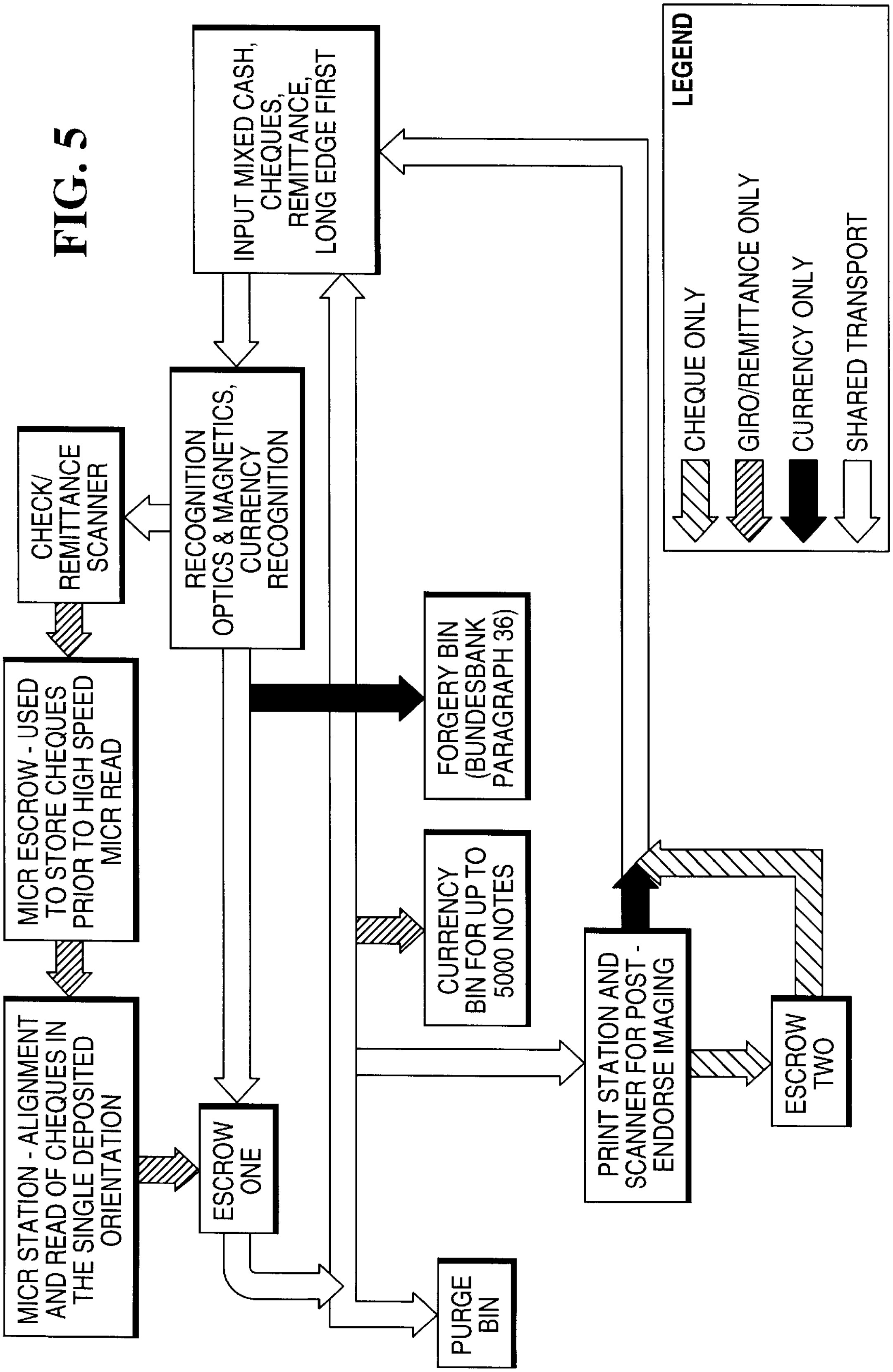

Further variations are illustrated in FIGS. 4 and 5. These show respectively manual and automatic sorting of deposited items, with the storage of deposited checks being located within the safe 34, rather than outside the safe. These Figures also illustrate in more detail the processing of deposited checks before they enter escrow storage 22; an additional check escrow 336 is included which allows checks to be passed through a high speed MICR scanner 338 to validate the check and determine its value, before passing the check to the main escrow 22, 322.

A further variation offered by these arrangements is that the check bin 24 within the safe 34 may act as a check escrow storage, allowing deposited checks to be returned through deposit aperture 18, when requested by an authorized user. This allows the SST operator to collect deposited checks from within the safe without having access to the safe itself, or the deposited banknotes therein.

Although the present invention has been described with reference only to banknotes and checks, it will be apparent that the invention may be used with a number of different types of media. For example, the invention may also be used to process payments from a user's bank account—a suitable remittance note may be deposited as if it were a check, and a suitably-configured SST may determine the value of the remittance and the payee from visual or other information recorded on the remittance note, and transfer the appropriate amount from the user's bank account to that of the payee. In this case, the cancelled remittance note may be returned to the user, rather than proceeding to a storage bin. The terminal may be operable to receive any financial instrument, including a check, a remittance note, and such like.

What is claimed is:

1. A method of processing media deposits in a self service terminal (SST) having a safe, a purge bin located within the safe, a cash deposit bin located within the safe, and a check deposit bin located outside the safe, the method comprising:

receiving a media deposit comprising a plurality of cash and check items;

determining whether each deposited item is cash or a check;

analyzing each deposited item to verify the items;

transferring each deposited cash item into the cash deposit bin located within the safe; and transferring each deposited check item into the check deposit bin located outside the safe.

2. A method of processing media deposits in a self service terminal (SST) having a safe, a purge bin located within the safe, a cash deposit bin located within the safe, and a check deposit bin located outside the safe, the method comprising:

receiving a media deposit comprising a plurality of cash and check items;

determining whether each deposited item is cash or a check;

analyzing each deposited item to verify the items;

transferring each deposited cash item into the cash deposit bin located within the safe; and transferring each deposited check item through the safe and into the check deposit bin located outside the safe so that an SST operator can collect deposited check items without opening the safe.

3. A self service terminal comprising:

a safe;

a purge bin located within the safe;

a cash deposit bin located within the safe;

a check deposit bin located outside the safe;

means for receiving a media deposit comprising a plurality of either cash or check items;

means for receiving information from a user to determine whether each deposited item is cash or a check;

means for analyzing each deposited item to verify the items;

means for transferring each deposited cash item into the cash deposit bin located within the safe; and means for transferring each deposited check item into the check deposit bin located outside the safe.

4. A self service terminal according to claim 3, further comprising an escrow storage location for storing deposited items prior to transferring them to one of the bins.

5. A self service terminal comprising:

a safe;

a purge bin located within the safe;

a cash deposit bin located within the safe;

a check deposit bin located outside the safe;

means for receiving a media deposit comprising a plurality of cash and check items;

means for determining whether each deposited item is cash or a check; means for analyzing each deposited item to verify the items; means for transferring each deposited cash item into the cash deposit bin located within the safe; and means for transferring each deposited check item into the check deposit bin located outside the safe.

6. A self service terminal according to claim 5, further comprising an escrow storage location for storing deposited items prior to transferring them to one of the bins.

* * * * *